Sept. 6, 1932.  E. V. TAYLOR  1,875,523
BRAKE
Filed Aug. 24, 1931
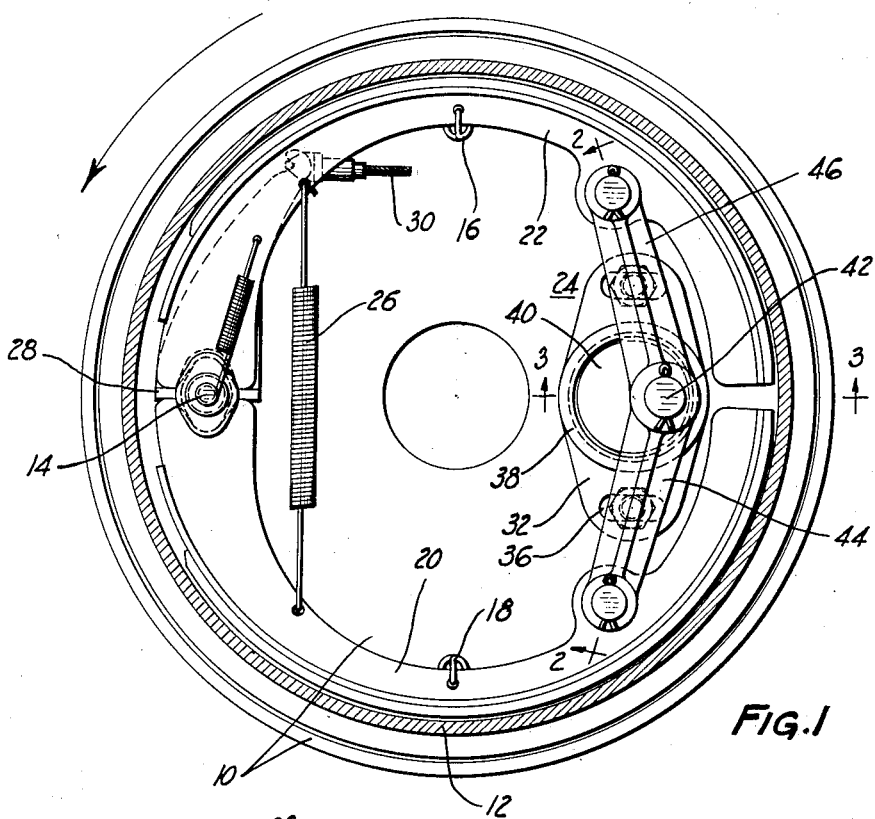
FIG.1
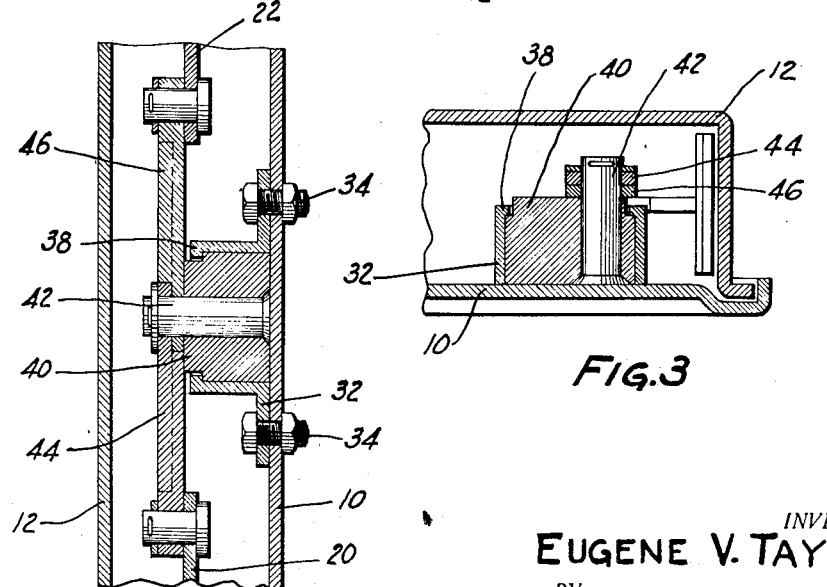
FIG.2
FIG.3
INVENTOR.
EUGENE V. TAYLOR
BY O.H. Fowler
ATTORNEY.

Patented Sept. 6, 1932

1,875,523

UNITED STATES PATENT OFFICE

EUGENE V. TAYLOR, OF CHICAGO, ILLINOIS, ASSIGNOR TO BENDIX BRAKE COMPANY, OF SOUTH BEND, INDIANA, A CORPORATION OF ILLINOIS

BRAKE

Application filed August 24, 1931. Serial No. 558,973.

This invention relates to brakes and more particularly to internal expanding brakes.

Broadly the invention comprehends a brake of the internal expanding type having a primary shoe and a secondary shoe and means for adjusting the shoes in proper spaced relation to the drum including means for transmitting the applied force from the primary shoe to the secondary shoe.

In the illustrated embodiment the primary and secondary shoes are connected by links to a pin mounted eccentrically on a disc rotatably positioned in a bearing on the backing plate, and as an additional feature the bearing is made adjustable on the backing plate to provide for adjustment of the shoes with relation to the drum. The force of the primary shoe on one link will cause the pin to rotate the disc in the bearing resulting in applying force to the link attached to the secondary shoe to operate the secondary shoe with increased effectiveness.

An important object of the invention is to provide an adjustable connection between the primary and secondary shoes of a brake.

Another important object of the invention is to provide a connection between the primary and secondary shoes of a brake including means for adjusting the over all length of the shoes and means for transmitting the applied force from the primary shoe to the secondary shoe with increased effectiveness.

A feature of the invention is a simple structure including an adjustable bracket having a disc positioned for rotation thereon and a pin mounted eccentrically on the disc to which is connected as by links the articulated ends of a primary and a secondary shoe.

Other objects and features of the invention will appear from the following description taken in connection with the drawing forming a part of this specification, and in which:

Fig. 1 is a vertical sectional view taken just back of the head of the drum illustrating the friction elements in side elevation and showing the invention as applied;

Fig. 2 is a sectional view substantially on line 2—2 of Fig. 1; and

Fig. 3 is a sectional view substantially on line 3—3 of Fig. 1.

Referring to the drawing for more specific details of the invention, 10 represents a fixed support such as a backing plate. The backing plate has associated therewith a rotatable drum 12 which may be secured to a wheel, not shown, and positioned on the backing plate is a fixed anchor 14 and suitable steady rests 16 and 18.

The steady rests support a primary shoe 20 and a secondary shoe 22. The articulated ends of the shoes are connected by an adjusting device indicated generally at 24 and the separable ends of the shoes engage the anchor 14. As shown, the shoes are connected by a suitable return spring 26 and positioned between the separable ends of the friction elements is a floating operating lever 28 connected through a cable 30 to a suitable source of power, not shown.

The structure above described is that of the conventional two shoe servo brake. The present invention resides in the connecting device indicated generally at 24 wherein a bracket 32 is adjustably mounted on the backing plate 10 as by bolts 34 extending through the flange of the bracket and through slots 36 arranged in parallel relation in the backing plate, so that the bracket may be adjusted radially of the brake. The bracket includes a bearing 38 in which is positioned for rotation a disc 40 having a pin 42 arranged eccentrically thereon. The primary shoe 20 is connected by a link 44 to the pin 42 and the secondary shoe 22 is connected by a link 46 to the pin 42. By moving the bracket toward or away from the braking surface of the drum the position of the shoes 20 and 22 may be adjusted with the relation to the drum.

In this structure force is applied to the primary shoe 20 through the operating cam 28. As the shoe is moved into drum engagement the applied force is augmented by the wiping action of the drum and this force is transmitted through the link 44 to the pin 42. Since the pin 42 is positioned eccentrically on the disc 40 the disc is given a slight rotation thus directing the force through the link 46 to the secondary shoe 22 to apply the secondary shoe with an equal distribution of the applied force and with increased effectiveness.

While the preferred embodiment of the invention has been described it is to be understood that this is merely given as an example of the underlying principles of the invention, and since this may be increased in other mechanical structures, I do not intend to be limited to that shown except as such limitations are clearly imposed on the appending claims.

Having thus described my invention what I claim as new and desire to secure by Letters Patent is:

1. A brake comprising friction elements, an adjustable bracket, an eccentric supported by the bracket and links pivotally connecting the eccentric to the friction elements.

2. A brake comprising friction elements, a bracket, means for adjusting the bracket, an eccentric supported by the bracket and links connecting the eccentric to the friction elements.

3. A brake comprising friction elements, an adjustable bracket positioned adjacent the articulated ends of the friction elements, an eccentric supported by the bracket and links connecting the friction elements to the eccentric.

4. A brake comprising friction elements, a bracket positioned adjacent the articulated ends of the friction elements, means for adjusting the bracket, a bearing supported by the bracket, a disc positioned for rotation in the bearing, a pin positioned eccentrically on the disc and links connecting the pin to the articulated ends of the friction elements.

5. A brake comprising a fixed support, friction elements positioned for movement on the support, an operating member between the separable ends of the friction elements, an adjusting device connected between the articulated ends of the friction elements including a bracket, means for adjusting the bracket on the support, a bearing supported by the bracket, a disc rotatable in the bearing, a pin positioned eccentrically on the disc and links connecting the pin to the articulated ends of the friction elements.

6. A brake comprising a fixed support, friction elements movable on the support, an anchor between the separable ends of the friction elements, a floating operating lever on the anchor between the separable ends of the friction elements and a connection between the articulated ends of the friction elements including a bracket, means for adjusting the bracket on the support, a bearing supported by the bracket, a disc rotatable in the bearing, a pin positioned eccentrically on the disc and links connecting the friction elements to the pin.

7. A brake comprising a fixed support, a rotatable drum associated therewith, friction elements positioned on the support for cooperation with the drum, an anchor positioned between the separable ends of the friction elements, a floating operating lever on the anchor between the separable ends of the friction elements, a connection between the friction elements including a bracket, means for adjusting the bracket on the support, a bearing supported by the bracket, a disc rotatable in the bearing, a pin positioned eccentrically on the disc and links connecting the pin to the friction elements at points spaced from the articulated ends of the friction elements.

In testimony whereof, I have hereunto signed my name.

EUGENE V. TAYLOR.